July 17, 1923.
R. J. BURROWS
VEHICLE WHEEL
Filed Jan. 17, 1920
1,461,889
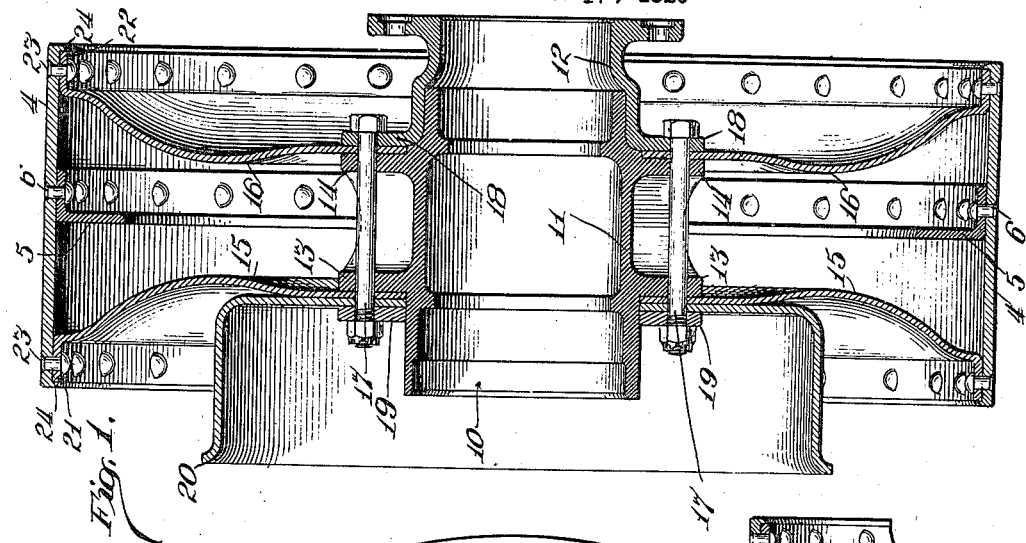
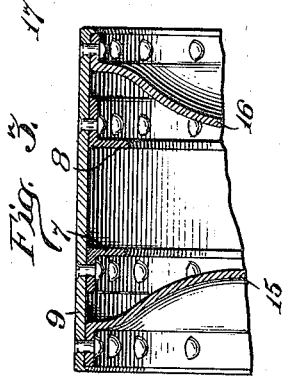
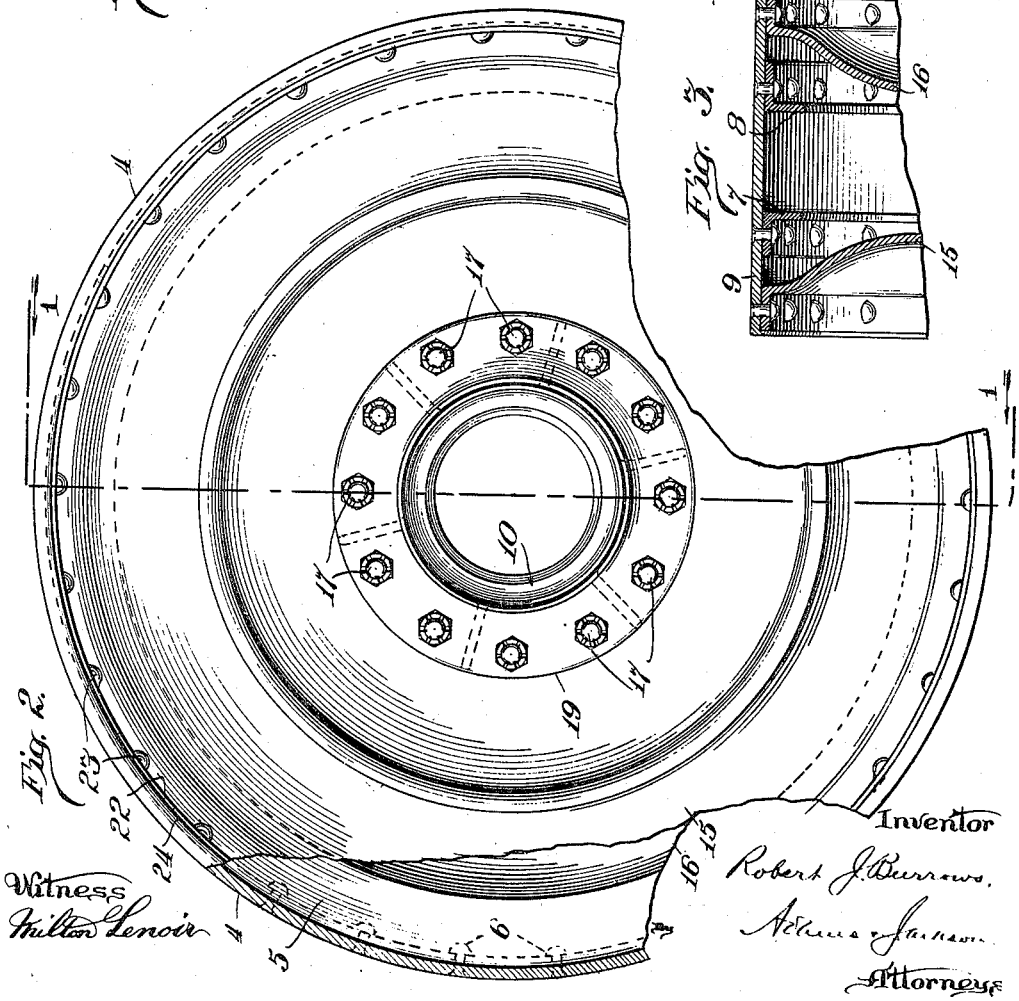
Witness
Milton Lenoir
Inventor
Robert J. Burrows.
Adams & Jackson
Attorneys Patented July 17, 1923.

1,461,889

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

VEHICLE WHEEL.

Application filed January 17, 1920. Serial No. 352,071.

*To all whom it may concern:*

Be it known that I, ROBERT J. BURROWS, a citizen of the United States, and a resident of Buchanan, in the county of Berrien, in the State of Michigan, have invented certain new and useful Improvements in Vehicle Wheels, of which the following is a specification, reference being had to the accompanying drawings.

My invention relates to wheels for motor vehicles, and particularly to metal wheels. It has for its object to provide an improved sheet metal wheel suitable for use on motor trucks and other vehicles designed to carry comparatively heavy loads, and to this end it consists in certain improvements in construction by which a very strong and substantial wheel may be produced and one which at the same time will be comparatively light and cheap to manufacture. The means by which I accomplish this end are illustrated in the drawings and are hereinafter described. What I regard as new is set forth in the claims.

In the accompanying drawings,—

Fig. 1 is a sectional view of my improved wheel taken on line 1—1 of Fig. 2;

Fig. 2 is a side elevation, some parts being broken away; and

Fig. 3 is a sectional detail showing a modification.

The wheel which forms the subject-matter of this application is of the same general type as that shown and described in my application for patent for improvements in metal wheels of even date herewith, Serial No. 352,072, but differs therefrom with respect to certain features of construction which will be hereinafter pointed out.

Referring to the drawings,—4 indicates the rim of the wheel which is a cylindrical metal band, reinforced and supported intermediately by an inwardly projecting annular rib 5 in the form of an angle iron, one flange of which fits against the under side of the rim 4 and is fixedly secured thereto by rivets 6. Preferably this rib extends continuously around the inside of the rim, as illustrated in Fig. 1. I do not herein claim broadly the use of an inwardly projecting annular rib, as that subject-matter is claimed in my said application, but I do claim herein the provision of such inwardly projecting rib by the means herein shown and described.

In Fig. 3 I have shown a modification of the construction shown in Fig. 1, which consists in providing the rim with two inwardly projecting annular ribs 7, 8 in the form of angle irons set oppositely to each other and spaced a distance apart on the rim 9. This construction may be advantageously employed where greater strength is desired or where the wheel is of extra width. These ribs serve to support the intermediate portion of the rim, adding materially to its strength and rigidity. It will be understood that the wheel shown may if desired be provided with an outside rim, preferably in the form of a demountable rim carrying a resilient tire, but as the use of outer rims of this character is old and well known in the art it is not thought necessary to illustrate it.

10 indicates the hub of the wheel which is made up of two members 11, 12 telescopically fitted together, as shown in Fig. 1. The member 11 is provided on its periphery with annular flanges 13, 14 spaced apart and connected by webs 15, said flanges serving as a means for attaching the rim 4 to the hub. For this purpose I provide two dished discs 15, 16 oppositely arranged with their convex surfaces toward each other, the inner portions of said discs being fitted against the outer faces of the flanges 13, 14, to which they are secured by bolts 17 passing through said discs and through the flanges 13, 14. The member 12 of the hub which fits upon the member 11 is provided at its inner margin with a radial flange 18 formed by bending the inner end of said member outwardly, and said flange 18 fits against the outer face of the disc 16 and is also held by the bolt 17. At the opposite side of the wheel a collar 19 is provided which fits against the outer face of the disc 15 and is also held by the bolt 17. Where the wheel is used on the rear axle of a vehicle it is provided with a brake drum 20 which fits upon the outer end of the member 11 of the hub, and in that case the collar 19 instead of being fitted against the disc 15 fits against the inner margin of the brake drum and is held by the bolts 17. Thus the bolts 17 serve not only to hold the members of the hub together, but also secure the inner portions of the discs 15, 16 and the brake drum in place.

The discs 15, 16 are provided at their outer edges with flanges 21, 22 which lie parallel with the inner face of the rim 4 against which they fit and to which they are secured by rivets 23, as shown in Fig. 1. The outer margins of the discs are further secured by inwardly projecting lips or flanges 24 at the margins of the rim 4, preferably formed by spinning or bending the edges of the rim inwardly so that they overlap and abut against the outer edges of the disc flanges 21, 22. This construction, separately considered, is not claimed herein as it forms the subject-matter of an application for patent filed by me of even date herewith, Serial No. 352,070.

By the construction described I provide a very strong and substantial wheel suitable for trucks and other heavy vehicles, which is not objectionably heavy and which may be manufactured at reasonable cost.

What I claim as my invention and desire to secure by Letters Patent, is—

1. A metal wheel comprising a rim, a hub composed of two telescoping members, one of said members having an intermediately disposed circumferential flange and the other of said members having its inner margin bent outwardly to form an integral radial flange, discs spaced apart and having their outer edges connected with the rim, and their inner marginal portions fitted at opposite sides of said circumferential flange, and bolts securing said discs and the members of the hub together.

2. A metal wheel comprising a rim, a hub composed of two telescoping members, one of said members having an intermediately disposed circumferential flange and the other of said members having its inner margin bent outwardly to form an integral radial flange, discs spaced apart and having their outer edges connected with the rim, the inner margins of said discs being fitted at opposite sides of said circumferential flange, a brake drum fitted upon one of the members of the hub, and bolts securing the members of the hub, said discs and the brake drum together.

ROBERT J. BURROWS.